(12) United States Patent
Wang

(10) Patent No.: US 10,109,068 B2
(45) Date of Patent: Oct. 23, 2018

(54) METHOD OF AUTOMATIC IDENTIFICATION AND CALIBRATION OF COLOR AND GRAYSCALE MEDICAL IMAGES

(71) Applicant: NANJING JUSHA DISPLAY TECHNOLOGY CO., LTD., Jiangsu (CN)

(72) Inventor: Wei Wang, Jiangsu (CN)

(73) Assignee: Nanjiang Jusha Display Technology Co., Ltd., Jiangsu (CN)

( * ) Notice: Subject to any disclaimer, the term of this patent is extended or adjusted under 35 U.S.C. 154(b) by 20 days.

(21) Appl. No.: 15/116,647

(22) PCT Filed: Apr. 9, 2015

(86) PCT No.: PCT/CN2015/076179
§ 371 (c)(1),
(2) Date: Aug. 4, 2016

(87) PCT Pub. No.: WO2016/106999
PCT Pub. Date: Jul. 7, 2016

(65) Prior Publication Data
US 2016/0350940 A1    Dec. 1, 2016

(30) Foreign Application Priority Data

Dec. 30, 2014 (CN) .................. 2014 1 08489162

(51) Int. Cl.
*G06K 9/00* (2006.01)
*G06T 7/40* (2017.01)
(Continued)

(52) U.S. Cl.
CPC .............. *G06T 7/408* (2013.01); *G06T 5/009* (2013.01); *G06T 7/0012* (2013.01); *G06T 2207/10024* (2013.01)

(58) Field of Classification Search
None
See application file for complete search history.

(56) References Cited

U.S. PATENT DOCUMENTS

| 2010/0194777 A1* | 8/2010 | Yamano | ................ G06T 11/001 345/595 |
| 2011/0169881 A1* | 7/2011 | Wallener | .............. G09G 3/3426 345/690 |

(Continued)

FOREIGN PATENT DOCUMENTS

| CN | 102629466 A | 8/2012 |
| CN | 202584681 U | 12/2012 |

(Continued)

OTHER PUBLICATIONS

International Search Report (PCT/ISA/210) dated Sep. 24, 2015, by the Japanese Patent Office as the International Searching Authority for International Application No. PCT/CN2015/076179.

(Continued)

*Primary Examiner* — Idowu O Osifade

(57) ABSTRACT

The present invention discloses an automatic recognition and calibration method of medical color and grayscale images. It includes the step of gray and binary image processing of an original image, the step of detecting, counting and merging the feature pixels, the step of determining the scope of each color or grayscale image, and the step of using the different calibration curve to the image according to the image color properties within its range in a monitor with brightness adjustment and brightness stabilization. In the display screen constructed with a plurality of color images and a number of grayscale images, the present invention can correctly classify display range of each color or grayscale image, and take different calibration methods for different images within the display range. Under the premise of avoiding complex information, it can ensure the (Continued)

quality of displayed images, and improve the accuracy and efficiency of medical diagnosis.

13 Claims, 1 Drawing Sheet

(51) Int. Cl.
*G06T 7/00* (2017.01)
*G06T 5/00* (2006.01)

(56) References Cited

U.S. PATENT DOCUMENTS

| | | |
|---|---|---|
| 2012/0229490 A1 | 9/2012 | Rezaee |
| 2015/0055025 A1* | 2/2015 | Gotoh .................. G09G 3/3426 348/790 |

FOREIGN PATENT DOCUMENTS

| | | |
|---|---|---|
| CN | 103400400 A | 11/2013 |
| CN | 104200792 A | 12/2014 |
| CN | 104484659 A | 4/2015 |

OTHER PUBLICATIONS

Written Opinion (PCT/ISA/237) dated Sep. 24, 2015, by the Japanese Patent Office as the International Searching Authority for International Application No. PCT/CN2015/076179.

* cited by examiner

METHOD OF AUTOMATIC IDENTIFICATION AND CALIBRATION OF COLOR AND GRAYSCALE MEDICAL IMAGES

FIELD OF THE INVENTION

The present invention relates to an automatic recognition and calibration method of medical color and grayscale images.

BACKGROUND OF THE INVENTION

With the rapid development of medical monitors, doctors can view both color and grayscale images on a high-resolution, high-brightness color display. Although it avoids the complex signal switching occurring in the diagnostic process and the troubles caused by diagnosing with both of grayscale display and single color display, there are the problems of display quality deterioration due to single GAMMA or DICOM calibration for image processing. For example, if the color image is calibrated using the DICOM, it will leads to color deviation and reduction of brightness. If the grayscale image is calibrated using the GAMMA, it will make the image brightness turn high and the color contrast reduce. Therefore, using a single calibration method cannot meet simultaneously the requirements of clear display of the color image and grayscale image in a same display screen. Meanwhile images will be disturbed by various color text, logo and kinds of information during the process of imaging diagnostic, and the traditional algorithms will erroneously determine such grayscale image as a color image, and then calibrate it using the GAMMA calibration curve. The above cases will affect the discovery and diagnosis of the disease to some extent.

SUMMARY OF THE INVENTION

The purpose of this invention is to provide an automatic recognition and calibration method of medical color and grayscale images.

To achieve the above-said purpose, the present invention provides an automatic recognition and calibration method of medical color and grayscale images, which takes different calibration methods based on different image color attributes in a monitor with brightness adjustment and brightness stabilization. This method is characterized by comprising the steps as follows:

step 1: according to component values of three channels R, G, B of each pixel of an original image, using the relationship of YUV and RGB color space to establish correspondence between the brightness and the three color components R, G, B, and expressing the corresponding pixel gray value with brightness, thereby forming the grayscale image;

step 2: setting a global threshold T, and comparing each pixel gray value of the grayscale image with T, if said gray value being greater than T, then taking the foreground color of the pixel, otherwise taking the background color of the pixel to form a binary image;

step 3: scanning line by line, detecting and counting pixels of the binary image, if the consecutive occurrences of the pixel having gray scale value of 255 being greater than a preset segment threshold, then judging it as a line segment and keeping it in a new image A; and then scanning the binary image column by column, detecting and counting pixels, if the consecutive occurrences of the pixel having gray scale value of 255 being greater than the preset segment threshold, then judging it as a line segment and keeping it in the image A; and finally, merging pixels of adjacent line segments respectively on the horizontal direction and vertical direction in the image A;

step 4: creating a new image named B, in which an rectangle with original length of a and the original width of b is drawn;

step 5: making the upper left corner of image A correspond to the upper left corner of the rectangular in image B, denoted as $(x_1, y_1)$, increasing the length of a and the width of b continuously, when the length increasing to a' and the width increasing to b', the pixel grayscale value of coordinate $(x_1+a', y_1+b')$ in image A being 255, judging whether the grayscale values of three coordinates $(x_1+a'+1, y_1)$, $(x_1, y_1+b'+1)$, $(x_1+a'+1, y_1+b'+1)$ being all 255, and if all of them being not 255, recording the current value of a' as width, b' as height, coordinate $(x_1+a', y_1+b')$ as $(x_n, y_n)$, and a' and b' being restored to the initial values of a and b;

step 6: making the upper left corner of image A correspond to the upper left corner of the rectangular in image B, denoted as $(x_1, y_1)$, increasing the length of a and the width of b continuously, when the length increasing to $a_0$ and the width increasing to $b_0$, and the pixel grayscale value of coordinate $(x_1+a_0, y_1+b_0)$ in image A being 255, judging whether the grayscale values of the pixels between coordinates $(x_1, y_1+b_0)$ and $(x_1+a_0-1, y_1+b_0)$ being all 255, and whether the grayscale values of the pixels between coordinates $(x_1+a_0, y_1)$ and $(x_1+a_0, y_1+b_0-1)$ being all 255; when the two conditions above being satisfied, then stopping to increase the values of $a_0$ and $b_0$, and recording the current value of $a_0$ as w, $b_0$ as h; if any one of the two conditions being not satisfied, recording the current coordinate values $(x_1+a_0, y_1+b_0)$ as $(x_{1\_1}, y_{1\_1})$, and restoring $a_0$ and $b_0$ to initial values of a and b; making coordinate $(x_{1\_1}, y_{1\_1})$ in image A correspond to the upper left corner of the rectangular, then again using the above method to scan the image, getting the length $a_1$ and width $b_1$, and recording the value of $a_1$ as w, $b_1$ as h;

step 7: using width/w, $x_1$ and $x_n$ to determine the set of coordinates in the X direction as X_coord: $(x_1, x_2, \ldots, x_p)$(p is the number of image fields in the X direction), and using height/h, $y_1$ and $y_n$ to determine the set of coordinates in the Y direction as y_coord: $(y_1, y_2, \ldots, y_q)$(q is the number of image fields in Y direction); meanwhile, traversing X_coord and y_coord to obtain set of coordinates of starting coordinates and ending coordinates as Coord: $\{(x_i,y_j),(x_{i+1},y_{j+1}) | 1 \le i < p \text{ and } 1 \le j < q\}$;

step 8: determining images within the starting coordinate and ending coordinate in each of the image fields obtained above as grayscale image or color image; randomly sampling pixels in the image fields, sampling number being k; if the ratio of the total number of color pixels relative to its effective pixels being less than a ratio threshold, determining this image to be a grayscale image, and otherwise determining to be a color image;

step 9: calibrating image fields determined as grayscale images by the corresponding DICOM3.14 calibration curve, and calibrating the above fields determined as color images by the corresponding GAMMA calibration curve.

Based on the above technical solution, and further comprising the subsidiary technical solutions:

In step 1, the corresponding relationship of the brightness and R, G, B three color components is: Y=0.30R+0.59G+0.11B.

In step 2, the global threshold T is set to 128. Line segment threshold, which determines whether it is the line segment or not, is set to 300 in step 3, the length a is set to one eighth length of the display screen and b is set to one eighth width of the display screen in step 4, step 5 and step 6, k is set to (total display screen pixels/number of the image fields)×½ and the ratio threshold value is set to 0.5 in step 8.

In step 2, taking said foreground color pixels means conversion to white, i.e., the grayscale value is set to 255. Taking background color pixels means conversion to black, i.e., the grayscale value is set to 0.

In step 8, effective pixels are defined as color pixels which are removal of black pixels and grayscale pixels, wherein the black pixels are determined as R=G=B=0, the grayscale pixels are determined as R=G=B, and the color pixels are determined where any two values of R, G, and B are not equal.

The image fields refer to the fields containing a domain-wide color image or grayscale image, and the display screen consists of several image fields.

The display screen is displayed on a monitor with brightness adjustment and brightness stabilization in all the steps.

The monitor with brightness adjustment includes a backlight module and an external input device.

Steps of switching on the monitors with brightness adjustment are as follows: when the operating system detects a monitor accessing to the DVI interface, it will read the information of EDID stored in the monitor through DDC channel, and output the image stream of video to the monitor, according to the optimal resolution in the information of EDID; and when the signal conversion chip of the monitor receives correct signals, it will send data to the backlight control module A. According to the characteristics of the display screen, the backlight control module A sequentially enables TCON, signals of LVDS, backlight power supply, backlight, ADJ backlight, and switches on the display backlight, display images and video, according to a required delay and timing.

The monitor with brightness adjustment has a different profile for adjustment, and the way of adjustment is as follows: after receiving the brightness adjustment instruction from the external input device, the controller outputs the corresponding pulse width modulated wave (PWM) according to the duty cycle stored in the FLASH. The backlight module controls the brightness to achieve the desired brightness after receiving this signal.

The monitor with brightness stabilization includes a backlight module, a sensitive probe provided in a rear hole of the backlight module, a color analyzer provided in front of the backlight module, a comparator using for comparing the luminance values collected from the sensitive probes and color analyzer, and a driving circuit driven by the results of the comparator.

The monitor with brightness stabilization is achieved as follows: in the factory, the engineers measure the correspondence under the different brightness and store it in the FLASH for the different characteristics of each display using a color analyzer and sensitive probes. In the normal lighting, the sensitive probes monitor the backlight brightness. Based on the correspondence stored in the FLASH, firstly, the backlight brightness reference value is set in the program. When the brightness value read by sensitive probes comparing with the set reference value is not within the error range, the program will adjust the brightness of the display by adjusting the brightness driving parameters of the drive circuit, so as to achieve the set backlight brightness reference value, so that the brightness of the display is stabilized.

Advantage of the Present Invention

In the display screen constructed with a plurality of color images and a number of grayscale images, the display range of each color grayscale image can be correctly classified, and different calibration methods can be used for different images within the display range, such that it can ensure the quality of displayed images and improve the accuracy and efficiency of medical diagnosis under the premise of avoiding complex information.

BRIEF DESCRIPTION OF THE DRAWINGS

The present invention is further described by referring to the drawings and specific embodiments.

THE MODE OF CARRYING OUT THE INVENTION

Examples

Figure 1:
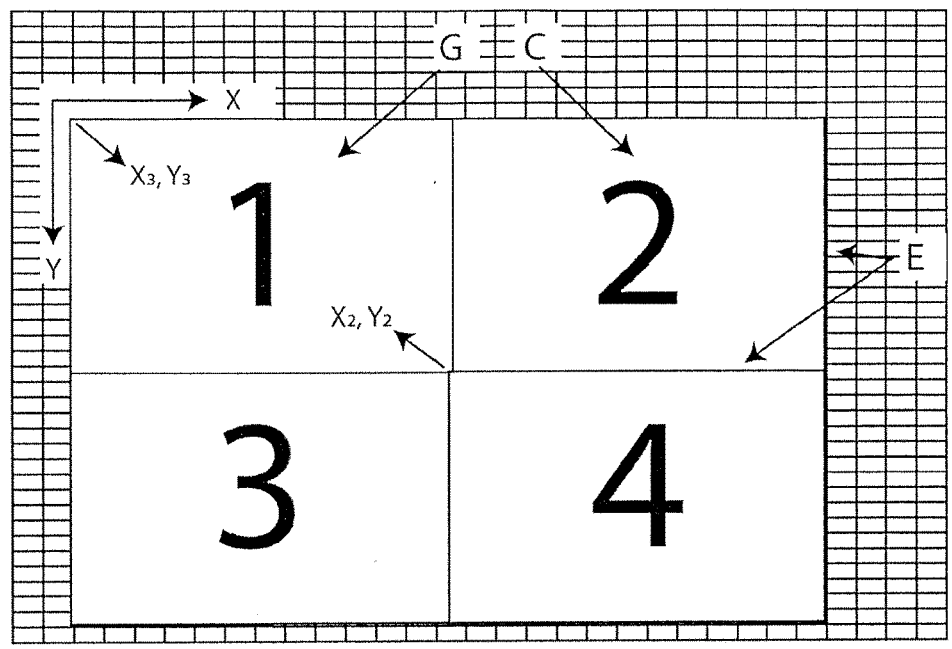
FIG. 1 is a schematic diagram of the display screen configuration in case 1 of the present invention.

Referring to FIG. 1, the present invention provides a specific embodiment of an automatic recognition and calibration method of medical color and grayscale images, including several color images C, several grayscale images G, and several borders E surrounding the C or G. In this embodiment, the number of the image fields is four, the image fields 1 and 4 are grayscale images, and the image fields 2 and 3 will be described as color images, the steps are as follows:

step 1. according to component values of three channels R, G, B of each pixel of an original image, using the relationship of YUV and RGB color space to establish correspondence between the brightness and the three color components R, G, B: Y=0.30R+0.59G+0.11B, and expressing the corresponding pixel gray value with brightness, thereby forming a grayscale image when all pixels of the original image are completely converted.

step 2. setting a global threshold of T=128, and comparing each pixel gray value of the grayscale image with T, if the gray value being greater than T, then taking the foreground color of the pixel (i.e., the point is converted to white, and the grayscale value is set to 255); otherwise taking the background color of the pixel (i.e., the point is converted to black, and the grayscale value is set to 0), thereby forming a binary image when all pixels of the grayscale image are completely converted.

step 3. scanning line by line, detecting and counting pixels of the binary image, if the consecutive occurrence of the pixel having grayscale value of 255 being greater than a preset segment threshold, then judging it as a line segment and keeping it in a new image A; and then scanning the binary image column by column, detecting and counting pixels, if the consecutive occurrence of the pixel having grayscale value of 255 being greater than the preset segment threshold, then judging it as a line segment and keeping it to the new image A. Setting the threshold value is to reduce the influences of too bright or isolated pixels in the image on detecting the borders around the image. Therefore, the segment threshold value can be set according to the size of the display screen. Finally, the adjacent line segments on the horizontal direction and vertical direction are merged respectively in the image A, such that the border width can be displayed by one pixel, in order to facilitate accurate segmentation for each image field in the subsequent steps.

step 4. creating a new image named B, in which drawing an original rectangle with the length of a and the width of b.

step 5. making the upper left corner of image A correspond to the upper left corner of the rectangular in the image B, denoted as $(x_1, y_1)$, increasing the length of a and the width of b continuously, when the length increasing to a' and the width increasing to b', and the pixel's grayscale value of coordinate $(x_1+a', y_1+b')$ in image A being 255, judging whether the grayscale values of three coordinates $(x_1+a'+1, y_1), (x_1, y_1+b'+1), (x_1+a'+1, y_1+b'+1)$ being 255, and if all of them being not 255, recording the current value of a' as width, b' as height, recording coordinate $(x_1+a', y_1+b')$ as $(x_n, y_n)$, and a' and b' being restored to the initial values of a and b. Referring to FIG. 1 in detail, it can easily be seen that $(x_1, y_1)$ is coordinate of upper left corner of image field 1, $(x_n, y_n)$ is coordinate of bottom right corner of image field 4, width=$x_n-x_1+1$, height=$y_n-y_1+1$.

step 6. making the upper left corner of image A correspond to the upper left corner of the rectangular in image B, denoted as $(x_1, y_1)$, increasing the length of a and the width of b continuously, when the length increasing to $a_0$ and the width increasing to $b_0$ (wherein $a_0$ is less than or equal to a', $b_0$ is less than or equal to b'), and the pixel grayscale value of coordinate $(x_1+a_0, y_1+b_0)$ in image A is 255, judging whether the grayscale values of the pixels between coordinates $(x_1, y_1+b_0)$ and $(x_1+a_0-1, y_1+b_0)$ are all 255, and whether the grayscale values of the pixels between coordinates $(x_1+a_0, y_1)$ and $(x_1+a_0, y_1+b_0-1)$ are all 255; when the above two conditions being satisfied, then stopping to increase the values of $a_0$ and $b_0$, and recording the current value of $a_0$ as w, $b_0$ as h; if any one of the two conditions being not satisfied, recording the current coordinate value $(x_1+a_0, y_1+b_0)$ as $(x_{1\_1}, y_{1\_1})$, and restoring $a_0$ and $b_0$ to initial values of a and b; making coordinate $(x_{1\_1}, y_{1\_1})$ in image A correspond to the upper left corner of the rectangular, and again using the above method to scan the image, getting the length $a_1$ and width $b_1$, and recording the value of $a_1$ as w, $b_1$ as h. Referring to FIG. 1 in detail, it can be seen obviously that w is length of the upper border in image field 4, and h is length of the left border in image field 4. Step 5 is a prerequisite step to get values of the width and height to carry out Step 6. The prerequisite is the same, but the cut-off conditions used have changed, because the regional range for detecting the image is not the same.

step 7. using width/w, $x_1$ and $x_n$ to determine the set of coordinates in the X direction as X_coord (n is used to label the coordinate, $x_n$ is the X-axis of the right boarder of the image field): $(x_1, x_2, \ldots, x_p)$(p is the number of the image fields in X direction); and using height/h, $y_1$ and $y_n$ to determine the set of coordinates in the Y direction as Y_coord: $(y_1, y_2, \ldots, y_q)$(q is the number of the image fields in Y direction); meanwhile traversing X_coord and y_coord to obtain the set of coordinates between starting coordinates and ending coordinates Coord: $\{(x_i,y_j),(x_{i+1},y_{j+1})|1 \leq i < p$ and $1 \leq j < q\}$. Referring to FIG. 1 in detail, it can be seen obviously that, p=2, q=2 and set of coordinates between starting coordinates and ending coordinates of the image fields Coord: $((x_1,y_1), (x_2,y_2), (x_2,y_1), (x_3,y_2), (x_1,y_2), (x_2,y_3), (x_2,y_2), (x_3,y_3))$, wherein two coordinates $(x_1,y_1)$ and $(x_2,y_2)$ define image field 1, two coordinates $(x_2,y_1)$ and $(x_3,y_2)$ define image field 2, two coordinates $(x_1,y_2)$ and $(x_2,y_3)$ define image field 3, and two coordinates $(x_2,y_2)$ and $(x_3,y_3)$ define image field 4, thus, grayscale or color may be determined simply according to the range of the image fields, which effectively avoid the interference of adjacent images or other pixels.

step 8. determining the images within the starting coordinates and ending coordinates in each of the above image fields obtained above as grayscale images or color images; randomly sampling pixels in the image fields, sampling number being k; k is defined as (total pixels of the display screen/number of the image fields)×½, and if the ratio of the total number of color pixels relative to its effective pixels being less than a ratio threshold (the value of the ratio threshold is set to 0.5), this image being determined to be grayscale image, and otherwise it being determined to be a color image. The effective pixels are defined as color pixels and grayscale pixels which are removal of black pixels, and the black pixels are determined as R=G=B=0. The black pixels are removed because the background color is black and the black pixel is gray, it will have some impact on the determination of certain color images (for example, a three-dimensional reconstruction image). The grayscale pixels are determined as R=G=B, and the color pixels are determined where any two values of R, G, and B are not equal.

step 9. calibrating the image fields determined as grayscale images by its corresponding DICOM3.14 curve, and calibrating the above image fields determined as color images by its corresponding GAMMA curve.

Figure 2:
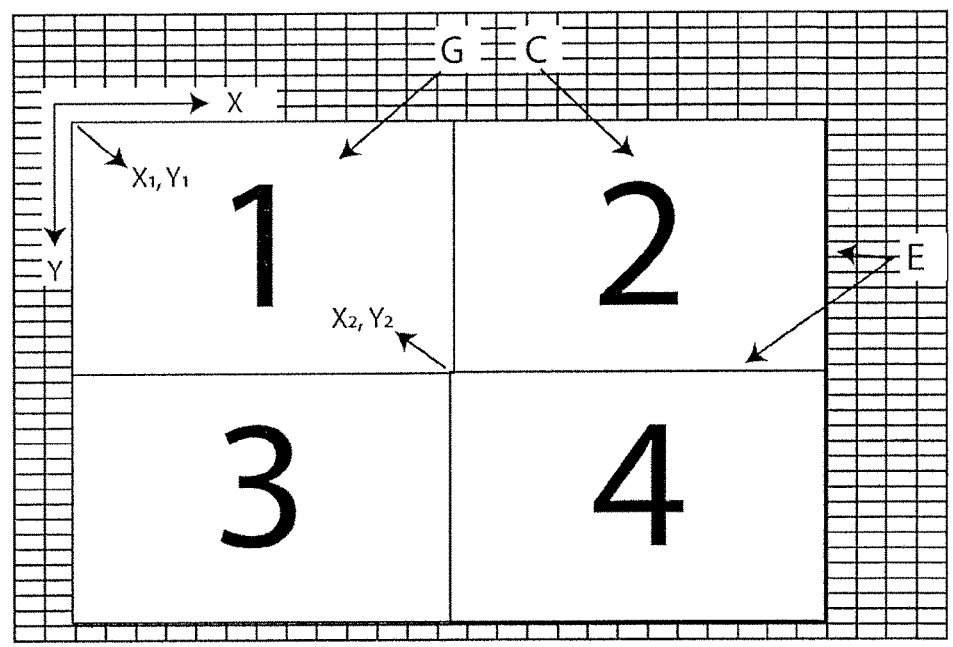
FIG. 2 is a schematic diagram of the display screen configuration in case 2 of the present invention.

As shown in FIG. 2, it is a schematic diagram of the display screen in case 2 of the present invention. It is the same as FIG. 1, and the only difference is the presence of a border around the image field 1.

In the monitor with brightness adjustment and brightness stabilization of the present invention, the original image is firstly gray and binary image processed. Then the feature pixels in the binary image are detected, counted and merged, thereby determining the scope of each color or grayscale image. Finally, the different calibration curves are used according to the image color properties within the image range. Under the premise of avoiding complicated information, it can ensure the display quality of the image and improve the accuracy and efficiency of medical diagnosis.

Of course, the above embodiment is for illustrating purposes and characteristics of the technical concept of the present invention. Its purpose is to make people familiar with this technology to understand the present invention and implement it, and not to limit the scope of protection of the present invention. Where do the equivalent transformation or modify in accordance with the spirit of mainly technical solution from this present invention, should fall within the protection scope of the present invention.

The invention claimed is:

1. An automatic recognition and calibration method of medical color and grayscale images, which takes different calibration methods based on different image color attributes wherein comprising the steps as follows:

step 1. according to color component values of three channels R, G, B of each pixel of an original image, using a relationship of YUV and RGB color space to establish correspondence between the brightness and the color component values for the R, G, B channels, and expressing a corresponding pixel gray value of a pixel with brightness, thereby forming a grayscale image;

step 2. forming a binary image by setting a global threshold T, and comparing each pixel gray value of the grayscale image with a global threshold of T, wherein if the pixel gray value is greater than T then using a foreground color of the pixel to form the binary image, otherwise using a background color of the pixel to form the binary image;

step 3. scanning the binary image line by line, detecting and counting pixels of the binary image, wherein if a first consecutive occurrences of pixels of the binary image have a gray scale value of 255 and greater than a preset line segment threshold, then judging the first consecutive occurrences as a line segment and keeping the first consecutive occurrences in a new image A; and then scanning the binary image column by column, detecting and counting pixels of the binary image, wherein if a second consecutive occurrences of pixels of the binary image have a gray scale value of 255 and greater than the preset line segment threshold, then judging the second consecutive occurrences as a line segment and keeping the second consecutive occurrences in the image A, and finally, merging pixels of adjacent line segments respectively on a horizontal direction and a vertical direction in the image A;

step 4. creating a new image named B, in which an original rectangle having an original length of a and an original width of b in image B is drawn;

step 5. making an upper left corner of the image A correspond to an upper left corner of the original rectangle of the image B, the upper left corner of the original rectangle being denoted as (x1, y1), and increasing the length of a and the width of b continuously, and when a is increased to a' and b is increased to b' and the pixel grayscale value of coordinate (x1+a', y1+b') in the image A is 255, judging whether the pixel grayscale value located at each of coordinates (x1+a'+1, y1), (x1, y1+b'+1), (x1+a'+1, y1+b'+1) is 255, wherein when each of the pixel grayscale value located at coordinates (x1+a'+1, y1), (x1, y1+b'+1), (x1+a'+1, y1+b'+1) is not 255 recording a pixel grayscale value at a' as a width, recording a pixel grayscale value at b' as a height, recording coordinate (x1+a', y1+b') as (xn, yn), and restoring the pixel grayscale value at a' to a and restoring the pixel grayscale value at b' to b;

step 6. making the upper left corner of the image A correspond to an upper left corner of the original rectangle of the image B, the upper left corner of the original rectangle being denoted as (x1, y1), and increasing the length of a and the width of b continuously, and when a is increased to a0 and b is increased to b0 and the pixel grayscale value of coordinate (x1+a0, y1+b0) in the image A is 255, judging whether the pixel grayscale value of each pixel located between coordinates (x1, y1+b0) and (x1+a0-1, y1+b0) is 255 as a first condition, and judging whether the pixel grayscale value values of each pixel located between coordinates (x1+a0, y1) and (x1+a0, y1+b0-1) is 255 as a second condition; when each of the first condition and the second condition is satisfied, then stopping the increase of a and b and recording a pixel grayscale value at a0 as w and recording a pixel grayscale value at b0 as h; when any one of the first condition and the second condition is not satisfied, then recording coordinate (x1+a0, y1+b0) as (x1_1, y1_1), and restoring the pixel grayscale value at a0 to a and restoring the pixel grayscale value at b0 to b; making coordinate (x1_1, y1_1) in the image A correspond to the upper left corner of the original rectangle of the image B, wherein steps 2-6 are iterated to obtain pixel grayscale value at a a1 location and to obtain a pixel grayscale value at a b1 location and recording the pixel grayscale value at a1 as w and recording the pixel grayscale value at b1 as h;

step 7. using width/w, x1 and xn to determine a set of coordinates in the X direction as X_coord: (x1, x2, . . . , xp), wherein p is the number of image fields in a X direction; and using height/h, y1 and yn to determine a set of coordinates in a Y direction as Y_coord: (y1,y2 . . . , yq), wherein q is the number of the image fields in the Y direction); meanwhile traversing the X_coord and the Y_coord to obtain a set of coordinates corresponding to a starting coordinate and an ending coordinate as Coord: {(xi,yj),(xi+1,yj+1) |1<=i<p and 1<=j<q} for each image field;

step 8. determining which images within the starting coordinate and ending coordinate in each image field is a grayscale image or is a color image by randomly sampling pixels in each image field, wherein designating an image as a grayscale image when a ratio of a total number of color pixels relative to a total number of their effective pixels is less than a ratio threshold, this image to be a grayscale image, and otherwise designating the image as a color image;

step 9. calibrating each image field determined to have a grayscale image by using a corresponding DICOM3.14 calibration curve, and calibrating each image field determined to have a color image by using a corresponding GAMMA calibration curve.

2. The automatic recognition and calibration method of medical color and grayscale images as described in claim 1, wherein: the relationship of YUV and RGB color space is Y=0.30R+0.59G+0.11B.

3. The automatic recognition and calibration method of medical color and grayscale images as described in claim 1, wherein:

the global threshold T is set to 128; and
the preset line segment threshold is set to 300;
the length a is set to one eighth of a length of a display screen and b is set to one eighth of a width of the display screen; screen,
a sampling number for random sampling is k and k is set to a value that=(total display screen pixels/number of above fields)×½ and the ratio threshold value is set to 0.5.

4. The automatic recognition and calibration method of medical color and grayscale images as described in claim 1, wherein: using the foreground color of the pixel comprises conversion to white by setting the pixel gray value to 255; using the background color of the pixel comprises conversion to black by setting the pixel gray value to 0.

5. The automatic recognition and calibration method of medical color and grayscale images as described in claim 1, wherein: the effective pixels are defined as color pixels that have black pixels and grayscale pixels removed, wherein the black pixels are determined as R=G=B=0, the grayscale pixels are determined as R=G=B, and the color pixels are determined where any two of R, G, and B are not being equal.

6. The automatic recognition and calibration method of medical color and grayscale images as described in claim 3, wherein: each image field refers to fields containing a domain-wide color image or a domain-wide grayscale image, and the display screen comprises several image fields.

7. The automatic recognition and calibration method of medical color and grayscale images as described in claim 1, wherein: the method is implemented on a monitor having brightness adjustment.

8. The automatic recognition and calibration method of medical color and grayscale images as described in claim 7, wherein: the monitor includes a backlight module and an external input device.

9. The automatic recognition and calibration method of medical color and grayscale images as described in claim 7, further comprising steps of switching on the monitor, wherein when an operating system detects the monitor accessing a DVI interface the operating system reads information of EDID stored in the monitor through a DDC channel, and outputs a image stream of video to the monitor, the signal conversion chip of the monitor receives correct signals, the monitor sends data to a backlight control module A, and according to a characteristic of a display screen of the monitor, the backlight control module A sequentially enables TCON, signals of LVDS, backlight power supply, backlight, ADJ backlight, and switches on a display backlight, display images and video, according to a required delay and timing.

10. The automatic recognition and calibration method of medical color and grayscale images as described in claim 7, wherein: adjustment with the monitor comprises after receiving a brightness adjustment instruction from an external input device, a controller outputs the a corresponding pulse width modulated wave (PWM) according to a duty cycle stored in a FLASH; and a backlight module controls brightness to achieve a desired brightness after receiving the PWM.

11. The automatic recognition and calibration method of medical color and grayscale images as described in claim 1, wherein: the method is implemented on a monitor with brightness stabilization.

12. The automatic recognition and calibration method of medical color and grayscale images as described in claim 11, wherein: the monitor includes a backlight module, a sensitive probe provided in a rear hole of the backlight module, a color analyzer provided in front of the backlight module, a comparator used for comparing luminance values collected from the sensitive probes and the color analyzer, and a driving circuit driven by results of the comparator.

13. The automatic recognition and calibration method of medical color and grayscale images as described in claim 11, wherein: brightness stabilization is achieved as follows: in a factory, engineers measure a correspondence under different brightness and store the correspondence in a FLASH for different characteristics of a display using a color analyzer and sensitive probes; in normal lighting, the sensitive probes monitor backlight brightness; based on the correspondence stored the program; and when a brightness value read by the sensitive probes is not within an error range as compared to a set reference value, the program adjusts the brightness of the display by adjusting brightness driving parameters of a drive circuit driving, so as to achieve a set backlight brightness reference value, so that the brightness of the display is stabilized.

* * * * *

UNITED STATES PATENT AND TRADEMARK OFFICE
CERTIFICATE OF CORRECTION

PATENT NO. : 10,109,068 B2  
APPLICATION NO. : 15/116647  
DATED : October 23, 2018  
INVENTOR(S) : Wei Wang Page 1 of 1

It is certified that error appears in the above-identified patent and that said Letters Patent is hereby corrected as shown below:

In the Specification

In Column 2, Line 41, delete "$x_p$)(p" and insert -- $x_p$) (p --, therefor.

In Column 2, Line 44, delete "y_coord:" and insert -- Y_coord: --, therefor.

In Column 2, Line 44, delete "$y_q$)(q" and insert -- $y_q$) (q --, therefor.

In Column 2, Line 46, delete "y_coord" and insert -- Y_coord --, therefor.

In Column 5, Line 53, delete "$x_p$)(p" and insert -- $x_p$) (p --, therefor.

In Column 5, Line 56, delete "$y_q$)(q" and insert -- $y_q$) (q --, therefor.

In Column 5, Line 57, delete "y_coord" and insert -- Y_coord --, therefor.

In the Claims

In Column 8, Line 10, in Claim 1, after "$y_2$" insert -- , --.

In Column 8, Line 11, in Claim 1, delete "direction);" and insert -- direction; --, therefor.

In Column 9, Line 26, in Claim 10, after "outputs" delete "the".

In Column 10, Line 23, in Claim 13, delete "stored" and insert -- store --, therefor.

Signed and Sealed this  
First Day of January, 2019

Andrei Iancu  
*Director of the United States Patent and Trademark Office*